ID#

(12) United States Patent
Curtis et al.

(10) Patent No.: US 8,225,403 B2
(45) Date of Patent: Jul. 17, 2012

(54) DISPLAYING A SECURITY ELEMENT TO HELP DETECT SPOOFING

(75) Inventors: Diane L. Curtis, New Haven, CT (US); Seana Seraji, Seattle, WA (US); Vinoo Cherian, Kirkland, WA (US); Aaron Filner, Seattle, WA (US); Randal J. Ramig, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1465 days.

(21) Appl. No.: 11/144,137

(22) Filed: Jun. 2, 2005

(65) Prior Publication Data

US 2006/0277605 A1     Dec. 7, 2006

(51) Int. Cl.
*G06F 12/16* (2006.01)

(52) U.S. Cl. .......................................... 726/24; 713/188
(58) Field of Classification Search .................. 713/188; 726/15, 22–25

See application file for complete search history.

(56) References Cited

U.S. PATENT DOCUMENTS

| | | | | |
|---|---|---|---|---|
| 5,864,666 A * | 1/1999 | Shrader | ............................ | 726/15 |
| 5,977,969 A * | 11/1999 | DiAngelo | ....................... | 715/780 |
| 6,892,206 B2 * | 5/2005 | Dharap | ......................... | 707/741 |
| 7,136,932 B1 * | 11/2006 | Schneider | ...................... | 709/245 |
| 7,315,902 B2 * | 1/2008 | Kirkland | ........................ | 709/247 |
| 7,587,387 B2 * | 9/2009 | Hogue | ................ | 707/3 |
| 2002/0040439 A1 * | 4/2002 | Kellum | ........... | 713/200 |
| 2004/0030784 A1 * | 2/2004 | Abdulhayoglu | ................ | 709/227 |
| 2004/0199493 A1 * | 10/2004 | Ruiz et al. | .......................... | 707/3 |
| 2005/0076222 A1 * | 4/2005 | Olkin et al. | ..................... | 713/176 |

\* cited by examiner

*Primary Examiner* — Christopher J Brown
*Assistant Examiner* — Amare F Tabor
(74) *Attorney, Agent, or Firm* — Merchant & Gould (57) ABSTRACT

A security element is displayed that provides information to a user to help ensure that they are not confused or misled into believing that content originates from a trusted source when in fact it does not. The security element shows the user the source of the content and is displayed in such a manner that the source of the content is easily viewable. For example, according to one embodiment, the security element is shown within the title bar of a window. The security element may also be temporarily shown. Providing the user with more information about the site being accessed helps them to make an intelligent decision about their browsing experience. The security element includes at least part of a domain name that identifies the source of the content. The security element may also include the entire domain name. For example, the security element may overlay the screen.

20 Claims, 6 Drawing Sheets

DISPLAYING A SECURITY ELEMENT TO HELP DETECT SPOOFING

BACKGROUND OF THE INVENTION

Having the ability to trust a source is an important part of the browsing experience. Preserving the security of a computer when accessing Internet sites, however, can be difficult. When using a web browser on a desktop computer having a large amount of screen space, the address bar is a good indicator of the source of information shown in the browser window. When using a mobile device, however, screen size may be much more limited making the use of address bar in a web browser impractical. Every day there are new ways of misleading ("spoofing") users to select actions they believe will perform a safe task when in actuality performing the task will be malicious. For example, the address used to access content may be maliciously set to imitate the address of a site associated with a trusted source. Upon seeing the address the user may be misled into believing that the site they are accessing is a trusted site when in actuality they are actually being redirected to an untrusted site.

SUMMARY OF THE INVENTION

Embodiments of the present invention relate to displaying a security element that provides information to a user to help detect spoofing.

According to one aspect of the invention, a security element is displayed that shows the user the source of the content. For example, the security element may be shown within a title bar, address bar, or within or overlaid on some element associated with the window. The security element may also be temporarily shown. Providing the user with more information about the site being accessed helps them to make an intelligent decision about their browsing experience. The security element informs the user of the location from where the content is originating.

According to another aspect of the invention, the security element is associated with a window on a device that has limited screen space and/or has a window that is constrained. The security element includes at least part of a domain name that identifies the source of the content.

DETAILED DESCRIPTION OF THE PREFERRED EMBODIMENT

Generally, embodiments of the present invention are related to displaying a security element that provides information to a user to help ensure that they are not confused or misled into believing that content originates from a trusted source when in fact it does not. A security element is displayed that shows the user the source of the content. For example, according to one embodiment, the security element is shown within the title bar of a window. The security element may also be temporarily shown. Providing the user with more information about the site being accessed helps them to make an intelligent decision about their browsing experience. According to one embodiment, the security element includes at least part of a domain name that identifies the source of the content.

Illustrative Windows including Security Element

Preventing spoofing is a challenging problem. For purposes of this disclosure, spoofing may be defined as impersonating a server without permission or deliberately inducing a user or a resource to take an incorrect action. For example, a technique for spoofing the trusted.com domain could be to direct the user to the trusted.net domain instead of the trusted.com domain.

Other common spoofing techniques include title manipulation as well as creating long domain names. In title manipulation even though the page is www.untrusted.com, the title of the page could be set to "Welcome to Trusted.com". The title normally appears in most browsers and is set in the HEAD portion of the HTML document using the <TITLE> tag. Creating a long domain name may mislead the user since a portion of the name may resemble a trusted site.

Displaying the source for the content is helpful in preventing a user from being misled. The domain shows the user the source of the content, and based on the displayed domain, the user is hopefully able to make a decision of trustworthiness for the content.

Users typically enter a uniform resource locator (URL) to access a resource on a network, such as the Internet. A URL is a standardized address used to access a resource and includes a domain name. Each resource is hosted on at least one server that has a unique IP address. To access a particular service, a user can specify its IP address in an appropriate application or enter its domain name, such as "www.trustedsource.com." The domain name is a user friendly name for the IP address of the resource. Domain names provide a persistent address to a resource even when the resource is moved from one server to another.

The domain name includes a subdomain, a top-level domain, and a second-level domain. The subdomain is listed first followed by the second-level domain, followed by the top-level domain. Some examples of top-level domains include: .com; .net; .org; .biz; .info; .name; .museum; .tv; .us; .uk; .fr; .es; .de; .it; .jp; and .ie. In the example www.mywebpage.com, "www" is the subdomain, "mywebpage" is the second level domain, and "com" is the top level domain.

Figure 3:
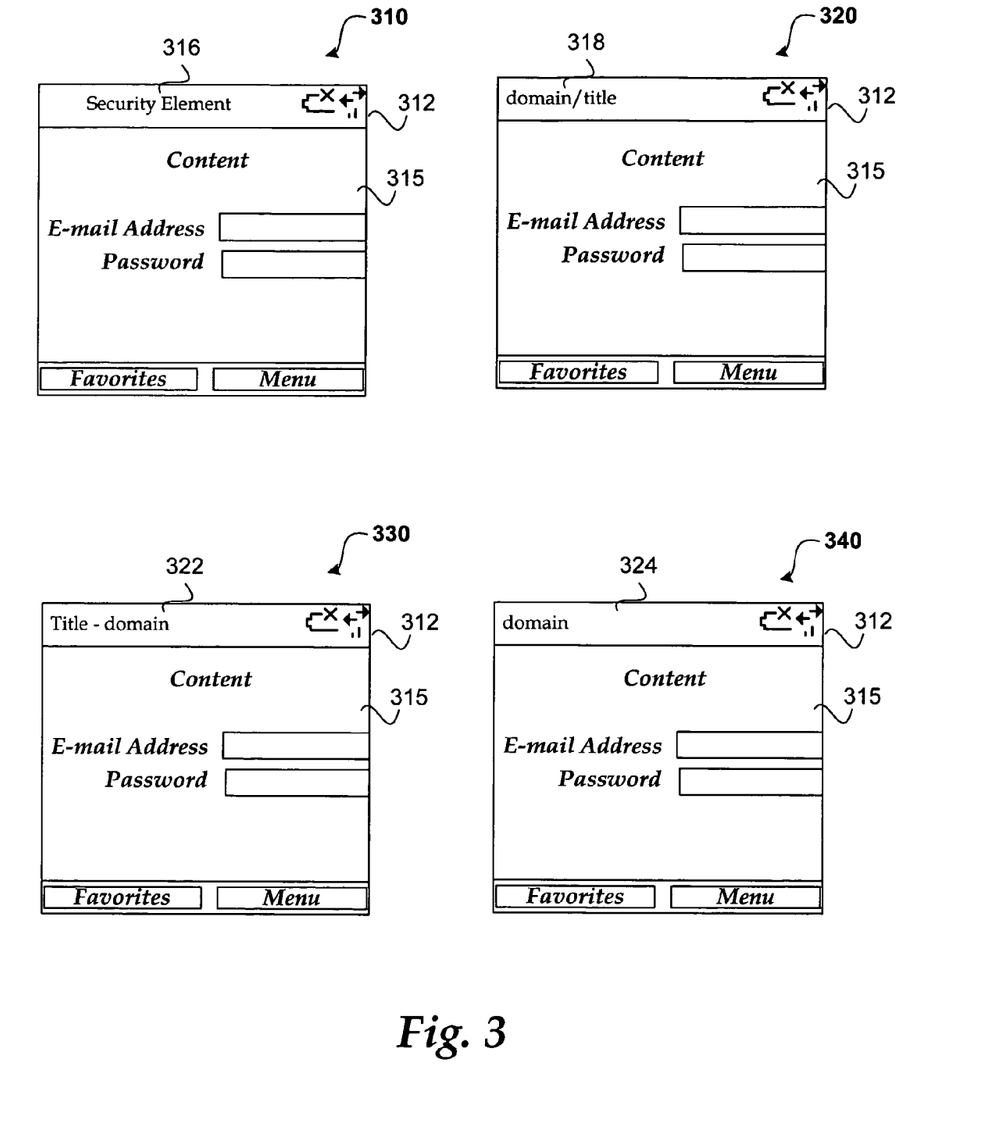
FIG. 3 shows exemplary windows that include a security element identifying the source of content.

FIG. 3 shows exemplary windows that include a security element identifying the source of content, in accordance with aspects of the invention. As illustrated, each window (310, 320, 330, 340) includes a title bar (312), a security element (316, 318, 322, 324) and content 315. According to one embodiment of the invention, the security element is displayed within windows that have a limited display area as compared to full size windows that may be displayed on a desktop computer. Full size displays typically associated with desktop computers range from between about 12 inches to 23 inches having a range of different resolutions, including 1024×768, 1152×864, 1280×1024, 1600×1200, 1920×1080, 1920×1200, 1920×1440, 2048×1536 and the like. Most portable devices, on the other hand, have limited screen sizes (typically 2-4 inches) and have resolutions closer to the following resolutions: 640×480, 240×320, 320×320, 176×220, 240×260, and 160×160. Both full size displays and portable devices, however, may set their resolutions to any available resolution on the device. According to one embodiment, A small screen may be defined as any screen or window that is smaller than twelve inches and has a resolution less than or equal to 640×480. A mobile screen is any screen and/or window that is displayed on a mobile device.

Window 310 illustrates a small screen including a security element (316) that shows the user where the content (315) originated from. Typically, on a mobile device, such as a cell phone or PDA, window 310 fills the entire screen. Window 310 may also be a window that has been sized on a larger display such that it does not utilize all of its available screen space and therefore is defined as a small screen. For example, window 310 could be a window on a desktop computer that has been resized to measure two inches diagonally.

Security element 316 is a visual element that identifies the source of the content to the user. Using security element 316, the user is easily able to determine whether or not to trust the content within window 315. Without security element 316, the user may not be shown where the content originates from and may be spoofed into entering their email address and password.

According to one embodiment of the invention, the current domain name associated with the displayed content is displayed within an element contained within the window. The user can easily assess the risk associated with content 315 by referring to the domain name within the element. According to one embodiment, the domain name is shown within the title bar. The domain name, however, may be displayed in many different ways. For example, the domain name could be included within an address bar, a menu bar, or some other element. According to another embodiment, the domain name may overlaid on the window. Whenever a user navigates to a different source, the domain name associated with the source is displayed.

As illustrated, content 315 is drawn as an exemplary login page. Without knowing the source of the content, the user could be misled into entering their personal login information. Displaying the domain name associated with the content within the security element helps in providing the user with the necessary information to distinguish where the content originates. As can be seen by referring to the windows in FIG. 3, the title bar (312) clearly informs the user from where the content originates. Malicious activity is therefore inhibited, helping to ensure that an end user is not confused or misled by content. The domain name information may be formatted in many different ways. The following are merely examples, and are not meant to be an exhaustive list.

Window 320 illustrates displaying the domain name and title of the window within the security element with the domain followed by the content (i.e. in the form "mywebpage.com/My Page." The domain name provides the user with a unique location for the content and the title provides the user with a title of the page. The title could be obtained from the <TITLE> tag, the title could be the name of the document that is being displayed, or the title could be any other information helpful in describing the document.

Window 330 illustrates displaying the security element (322) showing the domain and title in the form of Title—domain (i.e. MyPage—mywebpage.com).

Window 340 shows the security element (324) including only the domain name (i.e. mywebpage.com).

Figure 4:
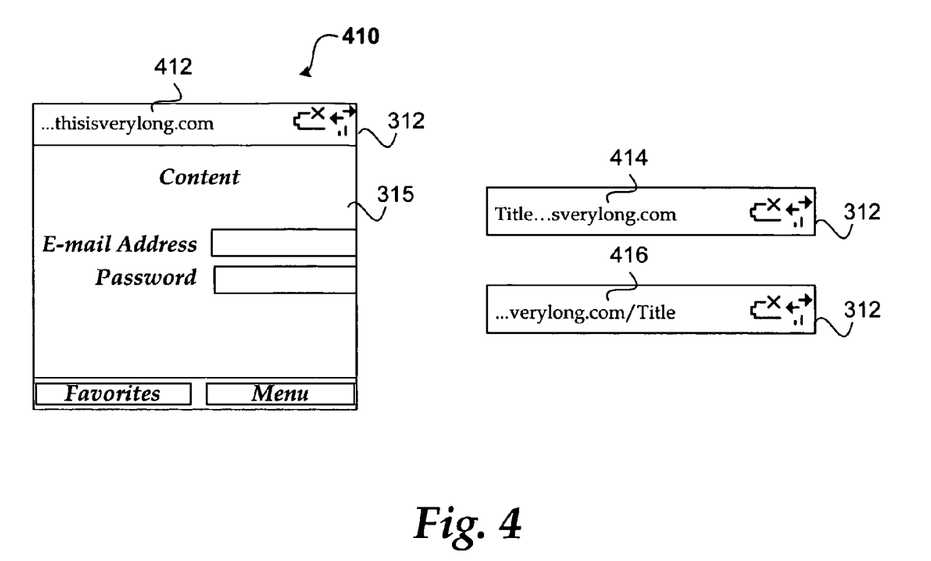
FIG. 4 illustrates truncating the domain name.

FIG. 4 illustrates truncating the domain name, in accordance with aspects of the present invention.

Domain names may be very long and as a result may not fit in the limited space available in a small screen. According to one embodiment, when a domain name is very long, the domain name is truncated to include as much of the ending part of the domain name as may be shown within the security element (412). The domain name is truncated to show as much of the second-level and top-level domains as possible such that more than just sub-domains are displayed. If the beginning part of the domain name is shown then only sub-domains may be shown, thereby allowing spoofing by sites that have the same sub-domain names but different second-level and top-level domains.

For example, assuming the security element is able to show eighteen characters plus an ellipses ( . . . ), then the last eighteen characters of the domain name are shown with an ellipses preceding the domain name. Showing the truncated domain name helps the user make intelligent decisions about spoofing.

According to one embodiment, the user may view the entire domain at any time by accessing a property page. Some other action and/or event could also cause the display of the entire domain name. For example, the entire domain name could be automatically displayed in response to the domain changing.

According to another embodiment, all or part of the domain name may be shown within a scrolling marquee, thereby providing the user with more information about the domain.

The domain name may be formatted in many different ways. For example, the title of the page may be displayed first within the security element followed by the truncated domain name (414). Another example is the title of the page following the domain name (416).

Figure 5:
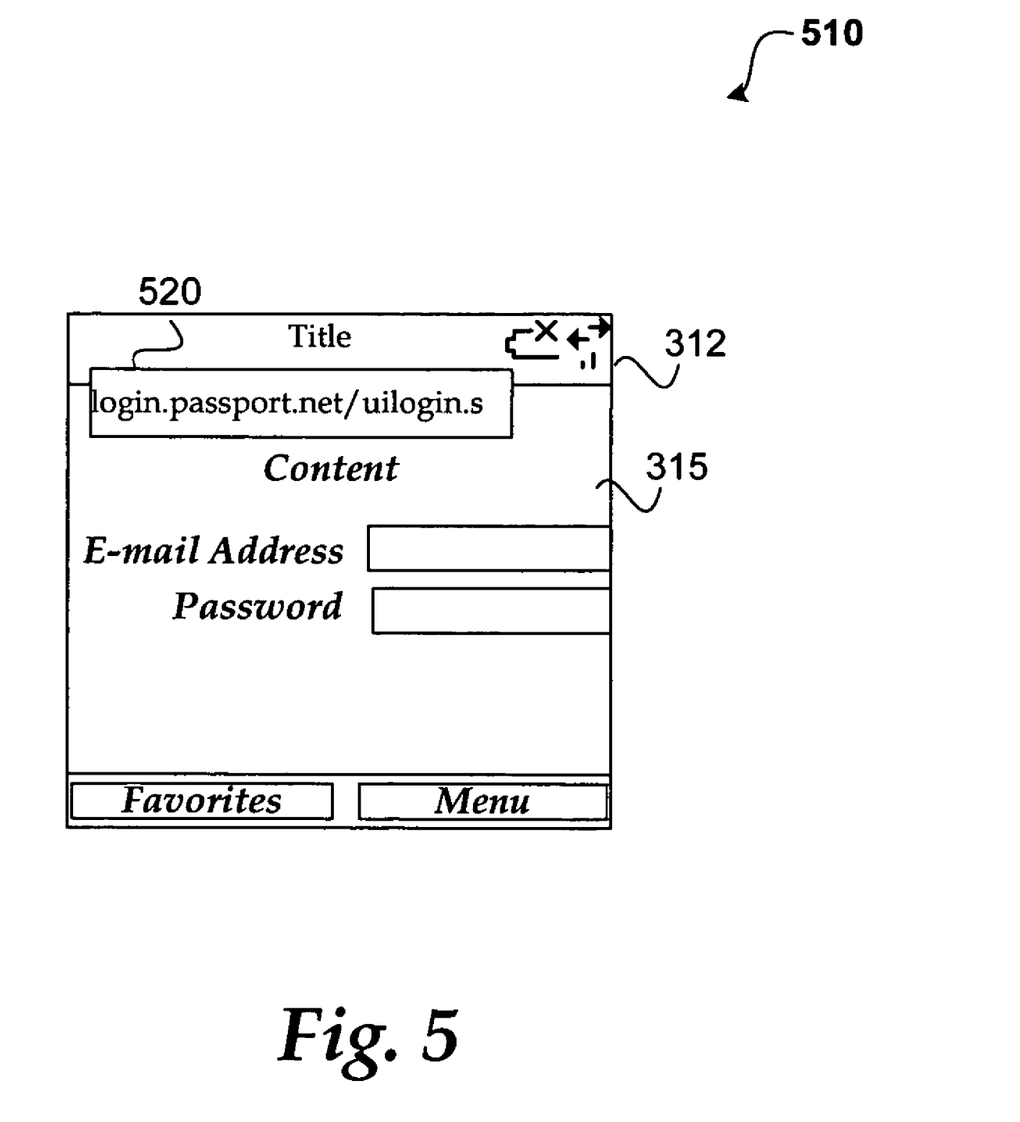
FIG. 5 shows displaying the security element over the window.

FIG. 5 shows displaying the security element over the window, in accordance with aspects of the invention. Instead of displaying the source of the content to the user within the title bar, the source could be shown to the user over the window. For example, the security element (520) could overlay window 510. The security element could be permanently displayed over window 510 or the security element could be displayed for a predetermined period of time and/or be removed by the user after some interaction. For example, security element 520 could be removed after the content is loaded, the user taps on window 510, or after a predetermined period of time.

Illustrative Process for Preventing Spoofing

Figure 6:
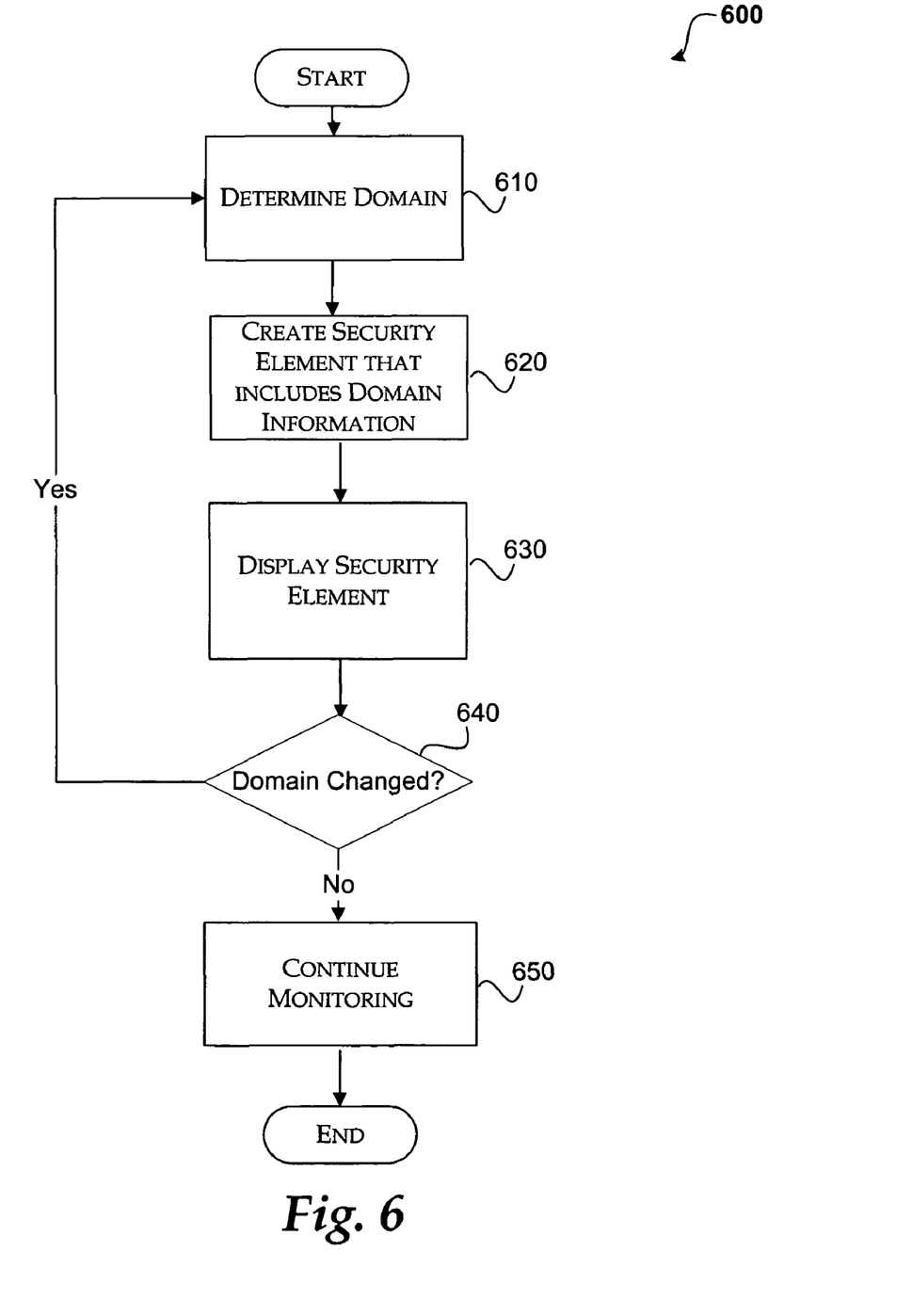
FIG. 6 illustrates a process for improving security for a small screen, in accordance with aspects of the invention.

FIG. 6 illustrates a process for improving security for a small screen, in accordance with aspects of the invention. After a start block, the process flows to block 610, where the domain name is determined. The domain name is determined by parsing the URL.

Moving to block 620, the security element that includes at least a portion of the domain name is created. According to one embodiment, the security element includes as much of the domain name as fits within the desired space. When the entire domain name does not fit, the domain name is truncated and includes as much of the ending part of the domain name as possible.

Flowing to block 630, the security element is displayed. According to one embodiment, the security element is displayed within the title bar. According to another embodiment, the security element overlays the window. According to yet another embodiment, the security element is temporarily displayed and then hidden after a predetermined user interaction occurs and/or after a predetermined period of time.

Transitioning to decision block 640, a determination is made as to whether the domain has changed. When the domain has changed, the process returns to block 610. When the domain does not change the process moves to block 650 where monitoring continues to determine whether the domain has changed. Monitoring the domain name helps to ensure that the user is presented with the current source for the content.

The process then moves to an end block and continues processing other actions.

Illustrative Operating Environment

Figure 1:
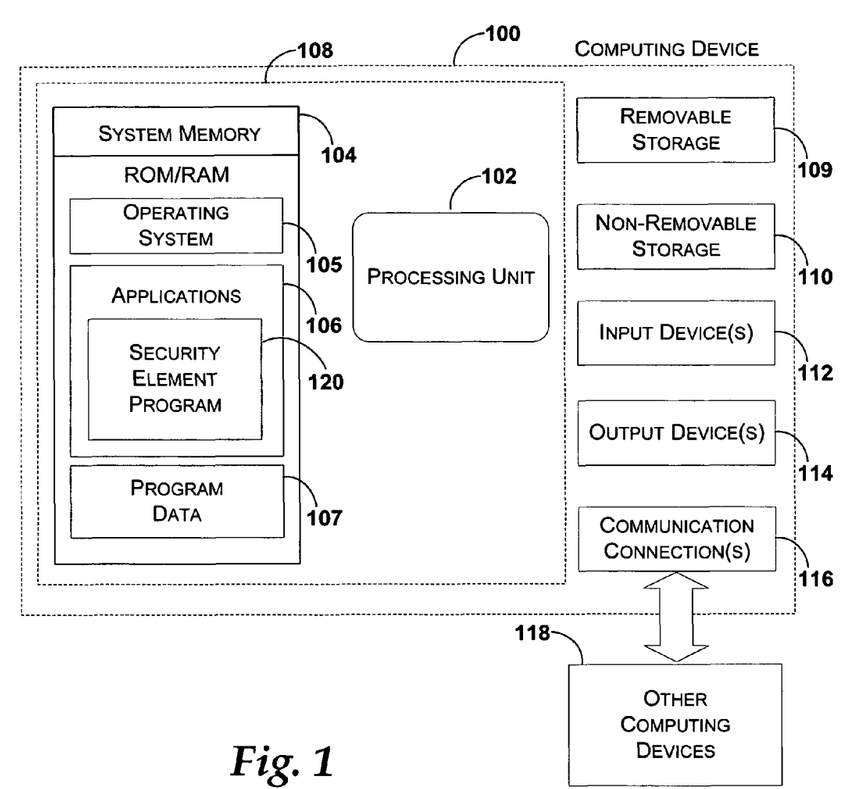
FIGS. 1 and 2 illustrate exemplary computing devices that may be used in exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a security element program 120 that is directed at displaying a security element indicating the source of content within a small window. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
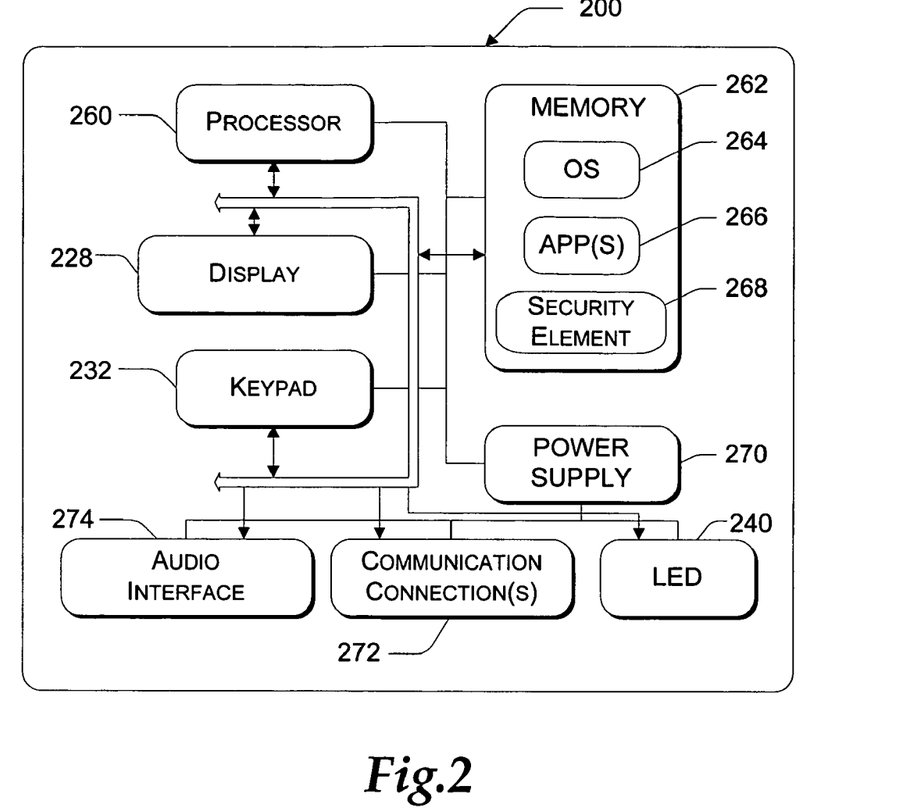

FIG. 2 illustrates a mobile computing device that may be used in one exemplary embodiment of the present invention. With reference to FIG. 2, one exemplary system for implementing the invention includes a mobile computing device, such as mobile computing device 200. Mobile computing device 200 includes processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, such as the Windows Mobile 2003 operating system from Microsoft Corporation, or another operating system, which is resident in memory 262 and executes on processor 260. Keypad 232 may be a push button numeric dialing pad (such as on a typical telephone), a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on the operating system 264. Security element application 268 is included that displays a security element showing the user the location of content. The application may reside in the hardware or software of the device. Mobile computing device 200 also includes non-volatile storage 268 within memory 262. Non-volatile storage 268 may be used to store persistent information which should not be lost if mobile computing device 200 is powered down.

Mobile computing device 200 includes power supply 270, which may be implemented as one or more batteries. Power supply 270 might further include an external power source, such as an AC adapter or a powered docking cradle that supplements or recharges the batteries.

Mobile computing device 200 is shown with two types of optional external notification mechanisms: LED 240 and audio interface 274. These devices may be directly coupled to power supply 270 so that when activated, they remain on for a duration dictated by the notification mechanism even though processor 260 and other components might shut down to conserve battery power. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes communications connection(s), such as a wireless interface layer, that performs the function of transmitting and receiving communications. Communications connection 272 facilitates wireless connectivity between the mobile computing device 200 and the outside world. The communication connection may configured to connect to any type of wireless network. According to one embodiment, transmissions to and from communications connection 272 are conducted under control of the operating system 264.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for providing information a user to help prevent spoofing, comprising:
  displaying content in a small screen; wherein the content that is displayed within the small screen is associated with a Uniform Resource Locator (URL) that identifies a source of the content;
  determining a domain name that comprises a subdomain followed by a second-level domain followed by a top-level domain that is associated with the content directly from text of the URL that identifies the source of the content;
  determining how much of the domain name fits within a predetermined space of a security element that is a visual element that identifies the source of the content by displaying at least a portion of the domain name;
automatically shortening the domain name to fit within the predetermined space that prioritizes including characters of the second-level and top-level domains of the domain name within the predetermined space over the subdomain such that characters in the subdomain are removed in the shortening before removing characters from the second-level and top-level domains and wherein characters within the second-level domain are removed in the shortening before removing characters from the top-level domain;
creating the security element that includes a display of the shortened domain name such that the shortened domain name shows the source of the content; and
displaying the security element including the shortened domain name within the small screen.

2. The method of claim 1, wherein the security element is displayed within a title bar.

3. The method of claim 1, wherein the security element is displayed over a portion of the content.

4. The method of claim 1, further comprising temporarily displaying the security element within the small screen.

5. The method of claim 1, wherein displaying the content within the small screen comprises displaying content within a screen having a resolution of less than or equal to 640×480.

6. The method of claim 1, wherein creating the security element that includes at least a portion of the domain name, comprises truncating the domain name.

7. The method of claim 6, wherein truncating the domain name comprises removing characters from the beginning part of the domain name.

8. The method of claim 1, further comprising determining when the domain changes and in response to the domain changing, updating the security element to reflect the domain change.

9. A computer-readable medium that is not a signal having computer executable instructions for providing information to a user to help prevent spoofing, the instructions comprising:
displaying content in a small screen, wherein the content is associated with a domain having a domain name that identifies a source of the content that is displayed;
extracting the domain name directly from a URL showing the source of the content;
determining how much of the domain name fits within a predetermined space of a security element that is a visual element that identifies the source of the content by displaying at least a portion of the domain name;
automatically shortening the domain name to fit within the predetermined space that prioritizes including characters of the second-level and top-level domains of the domain name over the subdomain such that characters in the subdomain are removed in the shortening before removing characters from the second-level and top-level domains and wherein characters within the second-level domain are removed in the shortening before removing characters from the top-level domain;
creating the security element that indicates the source of the content by displaying the shortened domain name that was automatically shortened within the security element such that the shortened domain name shows the source of the content, and
displaying the security element within the small screen.

10. The computer-readable medium of claim 9, wherein the security element is displayed within a title bar.

11. The computer-readable medium of claim 9, wherein the security element is displayed over a portion of the content.

12. The computer-readable medium of claim 9, further comprising temporarily displaying the security element within the small screen.

13. The computer-readable medium of claim 9, wherein displaying content within the small screen comprises displaying content within a screen having a diagonal size of less than four inches.

14. The computer-readable medium of claim 9, wherein creating the security element that indicates the source of the content comprises including as much of an ending part of the domain name that fits within the predetermined space of the security element.

15. The computer-readable medium of claim 14, further comprising truncating the domain name.

16. An apparatus, comprising:
a hardware-processor and a computer-readable medium;
an operating environment stored on the computer-readable medium and executing on the hardware-processor;
a small display; and
an application operating under the control of the operating environment and operative to perform actions, including:
displaying content in the small display; wherein the content is associated with a domain name that identifies a source of the content;
extracting the domain name directly from the content; determining how much of the domain name fits within a predetermined space of a security element; wherein the security element is a visual element that identifies the source of the content;
shortening the domain name to fit within the predetermined space that prioritizes including characters of the second-level and top-level domains of the domain name over the subdomain such that characters in the subdomain are removed in the shortening before removing characters from the second-level and top-level domains and wherein characters within the second-level domain are removed in the shortening before removing characters from the top-level domain;
creating the security element that shows the source of the content by displaying the shortened domain name within the security element,
displaying the security element including the shortened domain name within the small display.

17. The apparatus of claim 16, wherein the security element is displayed within a title bar.

18. The apparatus of claim 16, wherein displaying the security element within the small display further comprises displaying the security element within the small screen for a predetermined period of time.

19. The Apparatus of claim 16, wherein creating the security element that indicates the source of the content comprises including as much of an ending of the domain name that fits within the predetermined space of the security element.

20. The apparatus of claim 16, further comprising truncating a portion of the domain name.

* * * * *